(No Model.) 2 Sheets—Sheet 1.

W. SUESS.
MECHANICAL MOVEMENT.

No. 452,654. Patented May 19, 1891.

WITNESSES:
Fred G. Dieterich
P. B. Turpin.

INVENTOR:
Werner Suess
BY
ATTORNEYS (No Model.) 2 Sheets—Sheet 2.

W. SUESS.
MECHANICAL MOVEMENT.

No. 452,654. Patented May 19, 1891.

WITNESSES:
Fred G. Dieterich
P. B. Turpin

INVENTOR:
Werner Suess
BY Munn & Co
ATTORNEYS

UNITED STATES PATENT OFFICE.

WERNER SUESS, OF WASHINGTON, DISTRICT OF COLUMBIA, ASSIGNOR OF ONE-HALF TO RICHARD EZDORF, OF SAME PLACE.

MECHANICAL MOVEMENT.

SPECIFICATION forming part of Letters Patent No. 452,654, dated May 19, 1891.

Application filed January 29, 1891. Serial No. 379,591. (No model.)

*To all whom it may concern:*

Be it known that I, WERNER SUESS, of Washington, in the District of Columbia, have invented a new and useful Improvement in Mechanical Movements, of which the following is a specification.

This invention is in the nature of a mechanical movement providing simple and easily-operating constructions, whereby two shafts arranged at oblique angles and in a common plane may be geared together without the intervention of bevel-gears, and whereby two shafts arranged at oblique angles and not in a common plane may be geared, such arrangement precluding the use of bevel-gears, as is well understood.

The invention consists in certain novel constructions and combinations of parts, as will be hereinafter described, and pointed out in the claims.

Figure 1:
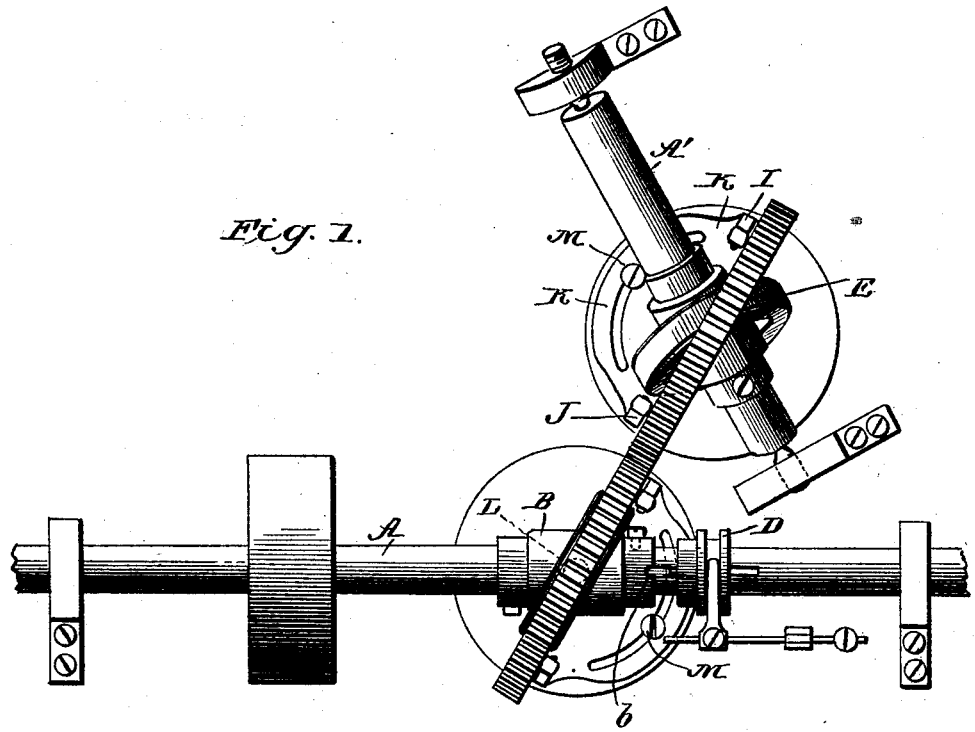
Figure 2:
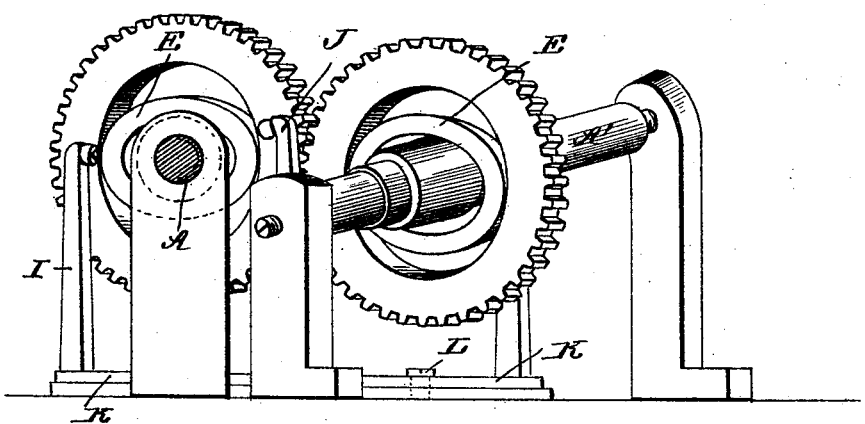
Figure 3:
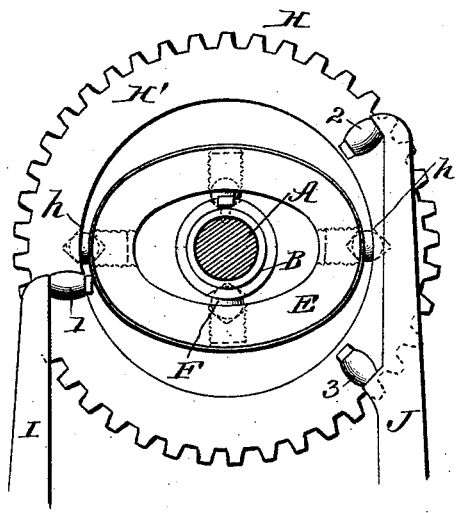
Figure 4:
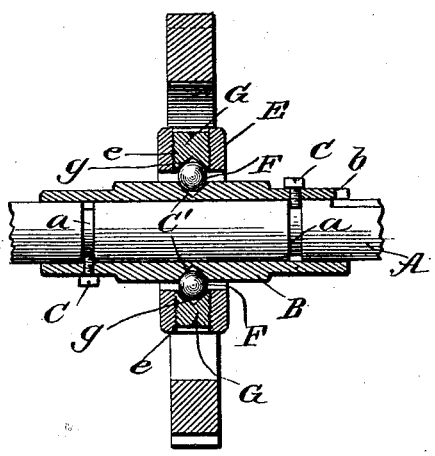
Figure 5:
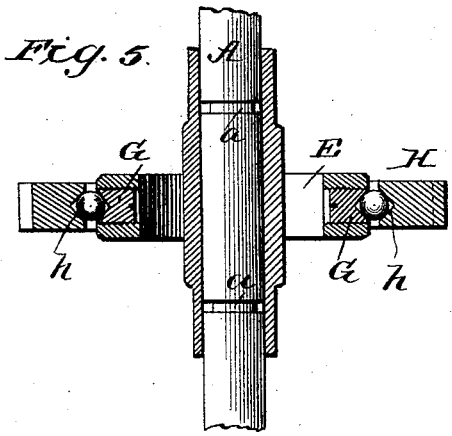

In the drawings, Figure 1 is a top plan view, and Fig. 2 is an elevation, of my improvement. Fig. 3 is a detail side view showing the guide-rollers, and Figs. 4 and 5 are detail sectional views.

In the construction shown the shaft A is supported to turn and may be revolved by any suitable power. On this shaft A is fitted a sleeve B, which is held from longitudinal movement on the shaft by means of screws or pins C, projecting from it into an annular groove or grooves $a$ in the shaft. At one end $b$ the sleeve B is constructed to form a clutch-section for engagement by the clutch-section D, keyed to and sliding on the shaft A, and may be moved by the devices shown or in other suitable manner into or out of clutch with section $b$. By this construction the sleeve B and the pulley or wheel proper connected therewith may be keyed to the shaft A or be caused to run loose thereon to serve as a drive-wheel or a loose wheel, as may be desired.

The ring or frame E is fitted over the sleeve and is pivoted at F thereto. These pivots are of special construction, being effected by forming sockets C' at diametrically-opposite points in the outer side of the sleeve B, fitting balls F therein, and also providing in the ring E sockets to receive such balls. To this end the ring E is provided at diametrically-opposite points with threaded openings $e$, into which the screws G turn. These screws are socketed at $g$ in their inner ends to receive the balls F. This is a simple construction for holding the balls in place, and also serves as a means for taking up wear.

The ring E, as shown, is made in the elongated or oval shape with its long or major axis at right angle with its pivotal axis or connection with the sleeve B. This form is preferred and is of importance, inasmuch as it enables the ring or frame E to turn to a greater angle with the sleeve B, as will be readily understood from the drawings.

The wheel or pulley proper H is pivoted at $h$ to the ring E at right angles to the pivot of such ring to the sleeve B and in similar manner to the said pivot of ring E on the sleeve B, except that in this outer pivot the balls fit at their inner sides in the socketed outer ends of screws G and at their outer sides in sockets formed in the pulley or wheel proper.

To permit the convenient insertion and removal of the pivot-balls, it is preferred to make the openings for the threaded screws slightly larger than the balls, so the latter may be inserted and removed through said openings when the screws are removed. It will be noticed that the pivots of the wheel proper to the ring E are arranged at right angles to the pivots of the ring to the sleeve B. This universal joint or gimbal connection permits the wheel or pulley proper to occupy either a right-angular or inclined plane to the axle or shaft, and when guided or held to any desired angle revolves with the shaft at that angle, no matter whether its position be right-angular or oblique. To hold the wheel to its plane of revolution, I provide adjustable guides 1, 2, and 3, preferably rollers, and three in number and arranged upon one or both sides of the wheel to bear against a plain face H' of the wheel proper. These rollers are arranged upon radial axes, and, as shown, are mounted upon standards I J, which rise from a base-plate K, that is pivoted at L centrally beneath the wheel or pulley and is provided with a curved slot and set-screw M, by which it may be held in any suitable adjustment.

Now when the wheel is adjusted to a position oblique to its shaft and the guide base-plate is adjusted to bring the guide-rollers against the side of the wheel, the revolution of the shaft causes the wheel to revolve in this angular position, the gimbal-joint permitting the wheel in revolving to adapt itself to the oblique plane. This adjustability of the guide mechanism is convenient, easy of operation, and may be readily set to secure the wheel in any desired position.

The wheels proper may be constructed to serve as band-pulleys or friction-pulleys without departing from some of the broad principles of my invention; but I find it especially important to employ the construction of wheels shown in Figs. 1 and 2, wherein the shaft A and a second shaft A' are arranged oblique to each other and out of a common plane. The wheels proper, supported on said shafts A A', are toothed gears arranged to mesh, and the gimbal or universal joint enables them when properly guided to preserve their true planes and mesh as the shafts revolve on their axes.

It will be understood that instead of using a separate sleeve B the ring E might be pivoted directly to the shaft; but the sleeve B is preferred for convenience in applying the improvements to shafts, and also because it enables the pulley or wheel to be used as both a drive and loose pulley by the aid of the clutch mechanism before described.

An important advantage obtained by my improvements is that I am enabled to greatly reduce the quantity of shafting in a machine-shop or other place where such shafting and counter-shafts are employed by belting or gearing from the main drive-shaft direct to the work at any desired angle, and I am enabled to directly connect shafts that are not parallel, the advantages of which are obvious to any mechanic. The guides may be carried by arms projecting from a plate below the wheel or pulley or upon arms projecting horizontally from a vertical wall, or said arms may descend from the ceiling like hangers.

Having thus described my invention, what I claim as new is—

1. In an apparatus, substantially as described, the combination of shafts at oblique angles to each other, the wheels secured on said shafts by gimbal or universal joints and having gear-teeth arranged and adapted to mesh, and guides by which to hold such wheels in position to mesh, substantially as and for the purposes set forth.

2. The combination, with an axial shaft, of a wheel connected to the shaft by a gimbal or universal joint, swiveled plate K with arms I J, and the three guide-rollers 1, 2, and 3, arranged upon said arms, substantially as shown and described.

3. In an apparatus, substantially as described, the combination, with a sleeve or center part, of a ring or frame, as E, fitted over and pivoted at diametrically-opposite points to the said center part and elongated or made oval with its major axis or direction of elongation at right angles to the line of its pivot-joint with the center part, substantially as set forth.

4. In an apparatus, substantially as described, the combination of a ring or pivotal support, a ring or wheel fitted over said pivotal support, balls forming a pivot-joint between said parts, one of the said parts being provided with sockets to receive one side of the balls and the other with screws forming adjustable seats for the opposite sides of the balls, all substantially as set forth.

5. The combination, in an apparatus, substantially as described, of the shaft A, the sleeve B, fitted on the said shaft and held from longitudinal movement thereon and revolving freely, clutch mechanism by which the said sleeve may be keyed to the shaft, the ring E, fitted over and pivoted to the sleeve A, the wheel fitted over and pivoted to the ring E, and guide devices for retaining the wheel in position, substantially as set forth.

WERNER SUESS.

Witnesses:
P. B. TURPIN,
C. A. PETTIT.